United States Patent Office.

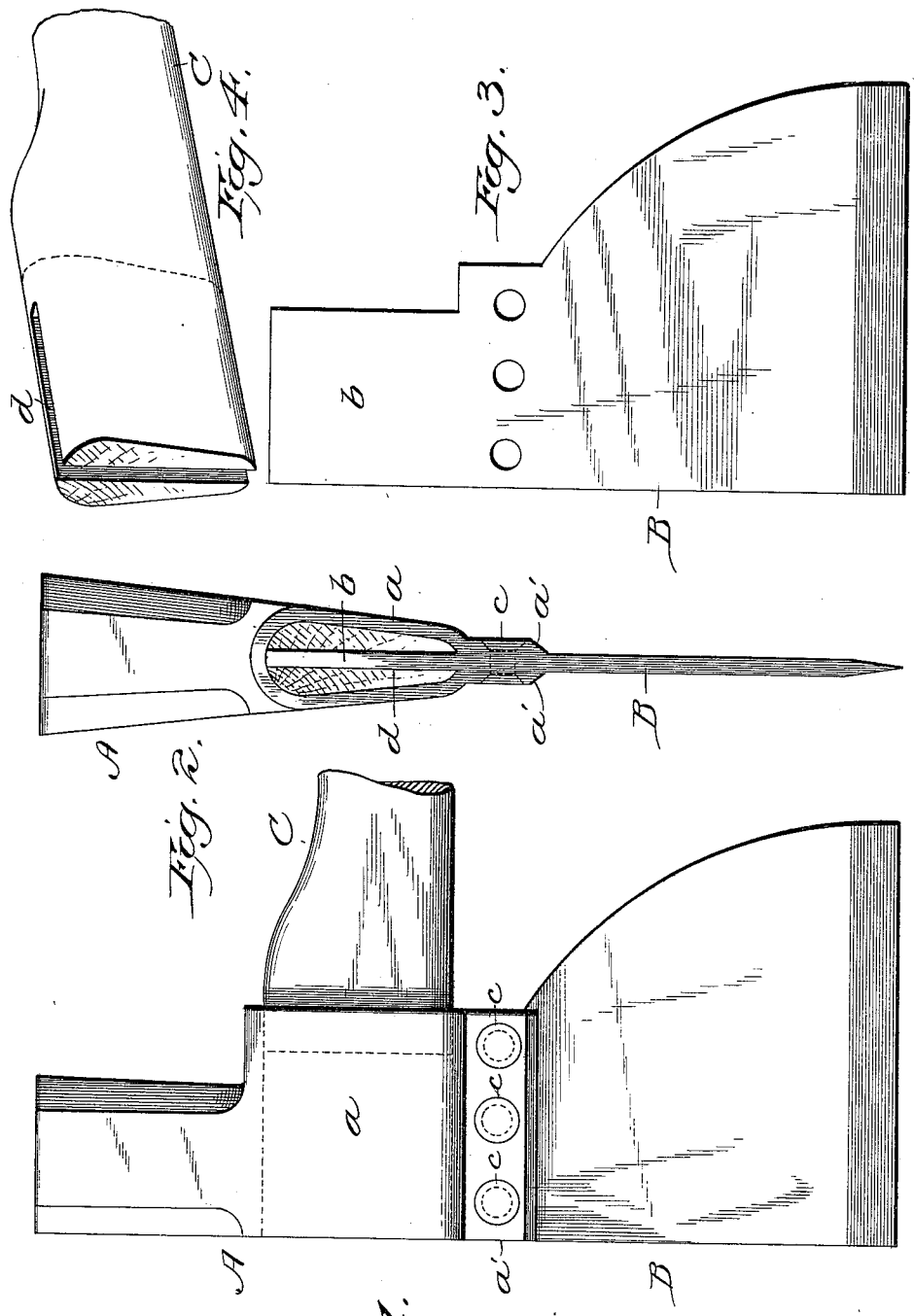

WILLIAM R. JENKINS, OF BELLEFONTE, PENNSYLVANIA, ASSIGNOR TO THE JENKINS IRON AND TOOL COMPANY, OF HOWARD, PENNSYLVANIA.

TOOL.

SPECIFICATION forming part of Letters Patent No. 613,207, dated October 25, 1898.

Application filed August 10, 1898. Serial No. 688,290. (No model.)

*To all whom it may concern:*

Be it known that I, WILLIAM R. JENKINS, a citizen of the United States, and a resident of Bellefonte, in the county of Centre and State of Pennsylvania, have invented certain new and useful Improvements in Tools, of which the following is a specification.

My invention relates to an improvement in tools, and more particularly to an improvement in hatchets, the object being to provide a strong and substantial tool which can be manufactured at small cost, but which at the same time will be effective and durable and free from the objections incident to articles of this character in which the blade is welded together or constitutes a small piece of good steel welded to the edge of the head.

With the foregoing object in consideration my invention consists, in a general way, of a tool of the class named or of any other variety composed of a head or pole of suitable material—as malleable iron, for instance—and a blade inserted between the sides of the eye thereof to any suitable depth, in which position it is riveted or otherwise secured.

It further consists in a tool composed of a head or pole and a blade inserted between the sides of the eye thereof and extended to the full depth thereof vertically, so that its inner end rests solidly against the rear inside wall of the eye, in which position it is riveted or otherwise secured, to the end that all sudden shock or strain due to the sudden and forcible impact upon either end of the tool in operation is absolutely taken from the rivets or other securing means which hold the head and blade together.

In the accompanying drawings, Figure 1 is a view of a hatchet in side elevation. Fig. 2 is an end view. Fig. 3 is a view of the blade detached; and Fig. 4 is a view of the handle, showing the depth of kerf.

A represents the head or pole, which is cast of some suitable kind of material—such, for instance, as malleable iron. B is the blade, it being cut from a solid piece of comparatively thin steel. The shank $b$, which is preferably narrower than the eye $a$ of the head, is inserted between the open sides $a'$ $a'$ of the eye and extends, preferably, the full depth of the latter vertically, so that its inner end abuts solidly against the inside wall of the eye, as shown more clearly in Fig. 2. The extreme edges of the sides $a'$ $a'$ are then riveted, as at $c$ $c$ $c$, or otherwise secured to the blade. The object of extending the shank the full depth of the eye, it will readily be seen, is to make a strong and substantial tool and at the same time relieve the rivets of all shock and strain when the tool is in use. When a blow is struck with a tool constructed in this manner whether with the blade or with the head, it follows that with the blade and head resting firmly against each other the rivets will not feel the impact, and, furthermore, the effectiveness of the tool is enhanced because of the metal extending directly and continuously through the longitudinal center or operating axis of the tool.

C indicates the handle. A saw-kerf $d$ is cut into one end of the handle a depth equal to the width of the blade-shank, so that when this end is inserted in the eye of the head it straddles the shank of the blade, and the object of cutting the shank of the blade narrower than the full width of the eye is to avoid having any portion of the split in the handle exposed and unbound, so as to in any wise weaken the tool at this point. It will be observed that this shank has the further function of acting in the capacity of a wedge to insure against the head and handle ever slipping apart. At the same time the handle affords lateral support for the blade-shank and prevents it from the slightest springing away from its normal position. On this same plan of structure it is evident that axes, as well as other tools of a similar character, might be constructed, as the resulting article is cheaply constructed and above all most effectual in the accomplishment of its prescribed and intended functions.

Having thus described my invention, what I claim as new, and desire to secure by Letters Patent, is—

1. As an article of manufacture, a tool comprising principally a head, made in a single piece of material, and a blade, the posterior part of the latter inserted between the side walls of the eye of the former and extending into the eye, so as to rest in line with the operating axis of the tool.

2. As an article of manufacture, a tool comprising principally a head or pole made in a single piece, and a blade, the blade being inserted in the eye of the head so that the two parts rest solidly together in line with the operating axis of the tool.

3. A tool consisting of a head having an eye, and a blade inserted in the eye and extending the full depth of the latter until its inner end abuts solidly against the inside wall of the eye so that a portion of the metal of the tool extends continuously from operating ends or edges through the operating axis or longitudinal center of the tool.

4. A tool comprising a head having an eye and open sides and a blade inserted between the sides into the eye and extending the full depth of the eye so that the inner end abuts on the inner or rear wall of the eye, and rivets secured through the sides and blade.

5. A tool consisting of a head having an eye therein, a blade inserted in the eye and extending the full depth of the latter, and a handle inserted in the eye and straddling the shank, the latter acting as a wedge therein and the end of the handle affording lateral support for the shank.

6. A tool consisting of a head, a blade extending the full depth of the eye thereof and secured in place therein, the end of the blade within the eye being narrower than the eye, and a handle split at one end to a depth equal to the width of that portion of the blade which is inside the eye so that an unsplit portion of the handle is held in the eye.

In testimony whereof I hereby affix my hand in the presence of two witnesses.

WILLIAM R. JENKINS.

In presence of—
  L. A. SCHAEFFER,
  GRANT HOOVER.